Aug. 6, 1940.　　　　F. T. HARRINGTON　　　　2,210,665
POWER TRANSMISSION
Filed Dec. 29, 1938　　　　2 Sheets-Sheet 1

INVENTOR
FERRIS T. HARRINGTON
BY
ATTORNEY

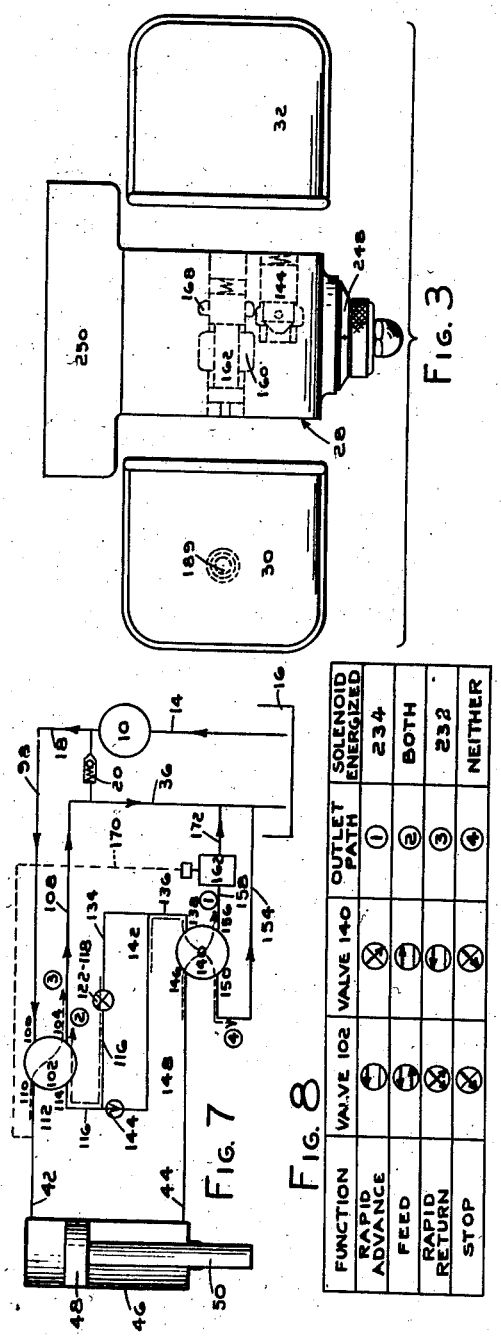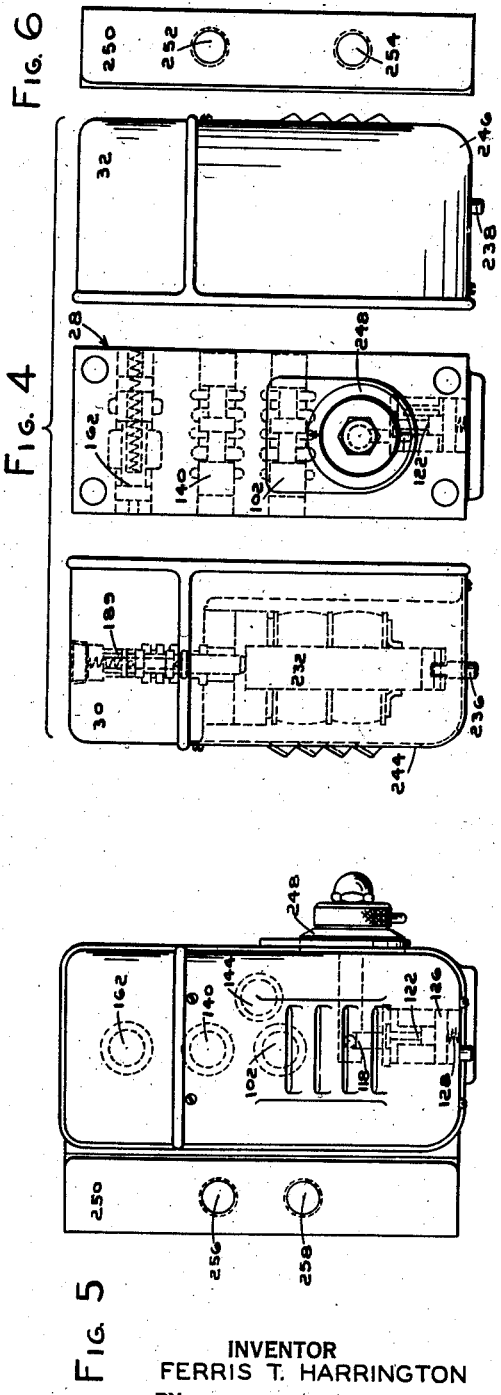
INVENTOR
FERRIS T. HARRINGTON
BY
ATTORNEY

Patented Aug. 6, 1940

2,210,665

UNITED STATES PATENT OFFICE 2,210,665

REISSUED

POWER TRANSMISSION

Ferris T. Harrington, Detroit, Mich., assignor to Vickers Incorporated, Detroit, Mich., a corporation of Michigan

DEC 2 - 1941

Application December 29, 1938, Serial No. 248,254

7 Claims. (Cl. 60—52)

This invention relates to power transmissions, particularly to those of the type comprising two or more fluid pressure energy translating devices one of which may function as a pump and another as a fluid motor.

The invention is more particularly concerned with a power transmission system particularly adapted for actuating a reciprocating slide subject to a gravity load such as the quill of a drilling machine.

It is an object of the present invention to provide a hydraulic power transmission system having improved means for preventing unwanted travel of the driven member under its gravity bias.

It is a further object to provide a system of this character wherein the control mechanism including all necessary valves is incorporated in a single panel constructed as a three-section assembly and wherein the two outside sections containing solenoid-operated pilot valves may be selectively assembled to different center sections to provide a complete line of control panel assemblies of various capacities.

Further objects and advantages of the present invention will be apparent from the following description, reference being had to the accompanying drawings wherein a preferred form of the present invention is clearly shown.

In the drawings:

Figure 3 is a top view, Figure 4 is a front view, and Figure 5 is an end view of the control panel, the two side sections being displaced for clearness of illustration, these three figures being arranged in orthographic projection on the sheet.

Figure 6 is an end view of the backing plate for the control panel.

Figure 7 is a simplified diagram of the hydraulic circuit.

Figure 8 is a table of the valve positions with reference to the circuit of Figure 7.

Figure 1:
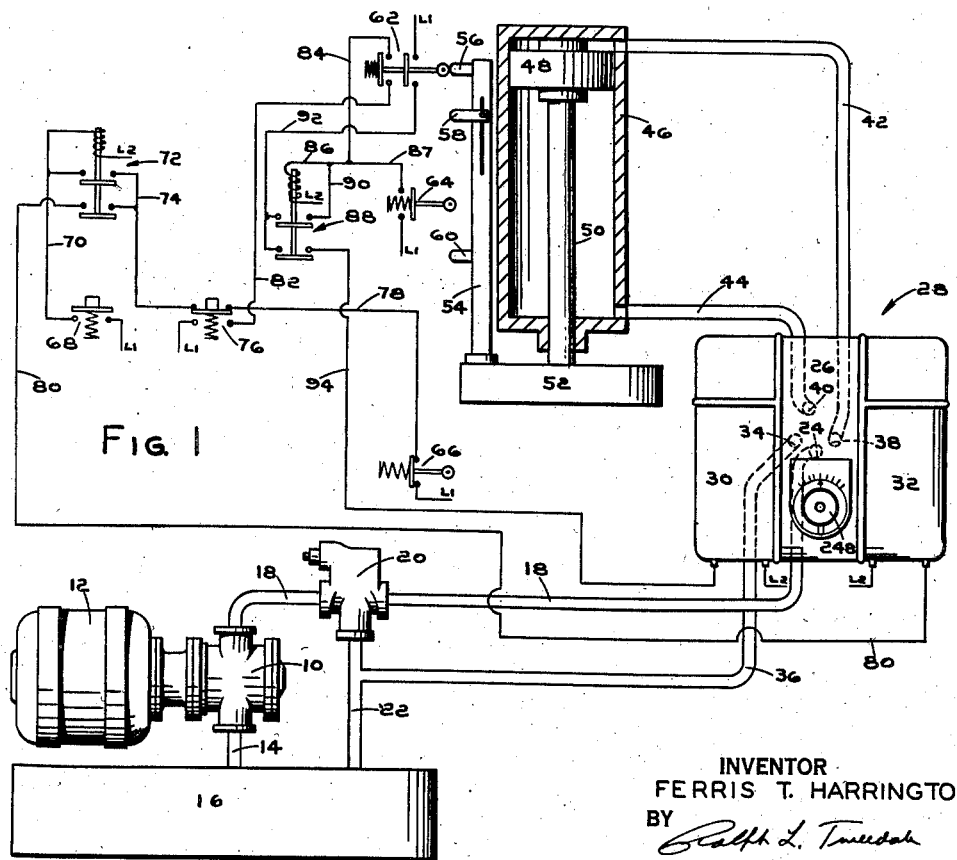
Figure 1 is a diagrammatic view of a power transmission system incorporating a preferred form of the present invention.

Referring now to Figure 1, there is shown a pump 10 driven by a prime mover such as an electric motor 12 to withdraw fluid from a tank 16 through a suction conduit 14. Fluid is delivered through a delivery conduit 18, a relief valve 20 of conventional construction being provided for by-passing fluid to the tank through a return conduit 22 whenever a predetermined pressure is exceeded in the delivery conduit 18. The delivery conduit 18 leads to a port 24 in the center section 26 of the control panel 28. The latter has side sections 30 and 32 containing solenoid-operated pilot valves later to be described.

A port 34 in the center section 26 connects by a conduit 36 with the tank. The center section 26 is also provided with cylinder ports 38 and 40 which connect by conduits 42 and 44 with the upper and lower ends of a cylinder 46. The latter carries a slidable piston 48 having a rod 50 to which is attached the load device 52. Secured on an upwardly extending arm 54 are three tripping dogs 56, 58 and 60 adapted to actuate limit switches 62, 64 and 66 respectively when the load device 52 is at the top, mid portion, and bottom positions respectively.

For the purpose of controlling the energization of the solenoids in sections 30 and 32 an electric circuit is provided. A momentary contact push button switch 68 is adapted when depressed to connect line $L^1$ by conductor 70 with the operating coil of a holding relay 72, the other side of which is connected to line $L^2$. The holding circuit 74 extends through the normally closed contacts of a double-throw push button switch 76 and by a conductor 78 through limit switch 66 and to line $L^1$. Thus, when the switch 68 is momentarily closed and the relay 72 is lifted, the holding circuit is established provided that the switch 76 is not depressed and limit switch 66 is in its normally closed position. Opening of either switch 76 or switch 66 will deenergize the relay 72 and permit the latter to drop. The controlled circuit of relay 72 extends from the conductor 74 through a conductor 80 to the solenoid in section 32, the other side of which is connected to line $L^2$. Thus, whenever relay 72 is raised, the solenoid in section 32 is energized.

The normally open contacts of the switch 76 are connected in a circuit extending from line $L^1$ by conductor 82 through the left-hand contacts of limit switch 62 and by conductors 84 and 86 to the operating coil of a holding relay 88. The relay 88 is normally initially energized by closure of the normally open limit switch 64 which when closed establishes a circuit from line $L^1$ through conductor 87 and conductor 86 to the coil of relay 88. The holding circuit of the latter extends from conductor 86 by conductors 90 and 92 to the right-hand contacts of limit switch 62 and thence to line $L^1$. Thus, whenever switch 76 is depressed and the limit switch 62 is in its normally closed position, the relay 88 will be raised and establish its holding circuit, thus maintaining the relay raised until the holding circuit is broken by opening of the limit switch 62. The controlled circuit of relay 88 extends from conductor 92 by a conductor 94 to the solenoid in section 30, the other side of which is connected to line L². Thus the relay 88 when lifted energizes the solenoid in section 30.

It will be seen that the electric circuit above described operates when the starting button 68 is depressed to lift the relay 72 which establishes its own holding circuit and also establishes a circuit from line L¹ through limit switch 66, conductor 78, switch 76, conductor 74 and conductor 80 to the solenoid in section 32. This, as will be described later, causes downward movement of the piston 48 carrying the dog rod 54. During the first part of this movement the dog 56 passes off from the switch 62 permitting the latter to close but not energizing the relay 88 due to the breaks in the circuit at switch 76. At some point in the mid portion of the travel the dog 58 contacts switch 64 energizing the relay 88 through conductors 87 and 86 and lifting the same to establish its holding circuit and to establish the controlled circuit extending from line L¹ through switch 62, conductors 92 and 94 to the solenoid in section 30. This, as will be later described, causes the piston 48 to continue its descent at a slower or feed rate of movement. As the piston 48 approaches the bottom of its stroke the dog 60 contacts the switch 66 opening the holding circuit for relay 72 and thus deenergizing the solenoid in section 32. This causes the piston 48 to ascend, and when it reaches the top the dog 56 contacts the switch 62 opening the same and breaking the holding circuit for relay 88, thus deenergizing the solenoid in section 30. This causes the device to come to rest.

Figure 2:
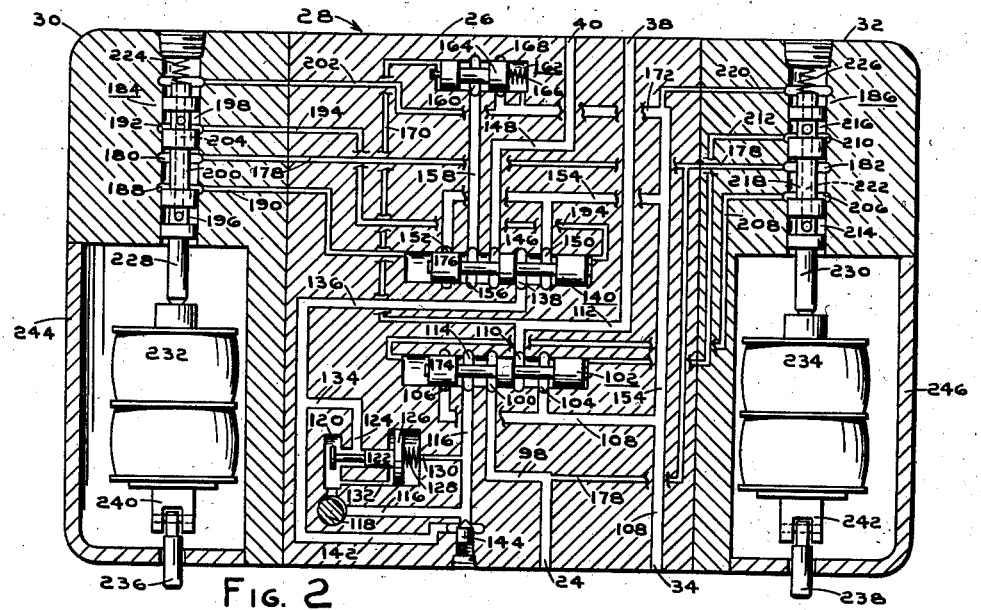
Figure 2 is a diagrammatic cross sectional view of a control panel forming part of the mechanism in Figure 1.

The internal construction of the panel 28 is illustrated at Figure 2. The port 24 in the center section 26 communicates by a conduit 98 which leads to the pressure port 100 of a pilot-operated four-way valve generally designated as 102. The latter has tank ports 104 and 106 which connect by a conduit 108 with the port 34. One cylinder port 110 connects by a conduit 112 with the cylinder port 38. The other cylinder port 114 connects by a conduit 116 with a manually adjustable throttle 118.

On the opposite side the throttle communicates with the discharge chamber 120 of a hydrostatic valve 122 having an inlet port 124. The valve 122 is under the control of a piston 126 and spring 128, the right-hand face of the piston being subject to pressure in the conduit 116 through a branch conduit 130 while the left-hand face of the piston is subject to pressure in the discharge chamber 120 through a conduit 132. The action of the hydrostatic valve 122 and throttle 118 is such as to maintain a fixed but adjustable rate of flow therethrough independently of pressure variations by maintaining a constant pressure drop across the throttle 118. The inlet port 124 of the hydrostatic valve 122 connects by a conduit 134 with a conduit 136 leading to one cylinder port 138 of a pilot-operated four-way valve 140. A by-pass conduit 142 connects between conduits 116 and 136 and contains a check valve 144 open to free flow from conduit 116 to conduit 136.

The pressure port 146 of valve 140 connects by a conduit 148 with the port 40. The tank ports 150 and 152 of valve 140 connect by a conduit 154 with the tank conduit 108. The other cylinder port 156 connects by a conduit 158 with a port 160 of a foot valve 162. The latter comprises a two-land spool 164 biased to the left by a spring 166 in which position the spool blocks communication between port 160 and a port 168. The left-hand end of the valve communicates with the conduit 112 through a branch conduit 170 so that whenever pressure exists in conduit 112 sufficient to overcome the force of spring 166 the spool 164 is shifted to the right to connect the ports 160 and 168. Port 168 and the right-hand end of the valve chamber connect by a conduit 172 to the tank conduit 154.

The spools 174 and 176 of the valves 102 and 140 are adapted to be shifted by hydraulic pressure admitted and exhausted to and from their end chambers under the control of the pilot valves which are disposed in the side sections 30 and 32. For this purpose a branch conduit 178 extends from the pressure line 98 to the opposite faces of the center section 26 and through the side sections 30 and 32 to the pressure ports 180 and 182 of solenoid-operated four-way pilot valves 184 and 186 respectively.

A cylinder port 188 of valve 184 connects by a conduit 190 with the left-hand end chamber of the valve 140. The other cylinder port 192 connects by a conduit 194 with the right-hand end chamber of the valve 140. The upper end of the valve 184 and drain chambers 196 and 198 formed in the spool 200 connect to tank by a conduit 202 and by a central bore 204 formed in the spool 200.

The pilot valve 186 is identical in construction to the pilot valve 184, its corresponding parts being designated as follows: One cylinder port 206 connects by a conduit 208 with the left-hand end of valve 102. Cylinder port 210 connects by a conduit 212 with the right-hand end of valve 102. Drain chambers 214 and 216 in the spool 218 connect to tank by a conduit 220 and a central bore 222. The spools of the pilot valves are spring biased downwardly by springs 224 and 226 and have projecting stems 228 and 230 which may be lifted by the solenoids 232 and 234. Emergency manual operating stems 236 and 238 may be secured to the armatures 240 and 242 respectively for manual lifting of either solenoid in case of power failure. The solenoids may be enclosed by angle-shaped cover plates 244 and 246.

The relative disposition of the various valves in the blocks 26, 30 and 32 is indicated in the projected views constituting Figures 3, 4, and 5. The throttle 118 may be connected to a suitable indicator handle 248 on the front of the central section. The ports 24, 34, 38 and 40 are preferably brought out to the back face of the center section 26 so that the latter may, if desired, be mounted directly upon a machine frame having corresponding ports adapted to register therewith when the block 26 is fastened thereto.

For applications where the machine frame is not especially designed for direct mounting of the panel on the frame, a backing plate 250 is provided for mounting the center section 26 and having cored passages therein which register with the ports in the back face of the center block 26 and lead to pipe connections 252 and 254 at one side and 256 and 258 at the other side.

Before considering the operation of the hydraulic circuit as a whole, it will be understood that whenever solenoid 232 is deenergized, pressure fluid from line 98 passes through conduit 178, port 180, port 188 and conduit 190 to the left-hand end of valve 140, shifting the latter to the right discharging oil from the right end through conduit 194, port 192, drain chamber 198, conduits 202 and 172 to tank. When solenoid 232 is energized the connections are reversed to admit pressure to the right end of valve 140 and connect the left end to tank whereby the valve shifts to the left. Identical action takes place with regard to the solenoid 234 controlling the valve 102 so that when solenoid 234 is deenergized the valve is shifted to its right-hand position and when energized the valve is shifted to its left-hand position.

The operation of the main hydraulic circuit may be more easily understood by reference to the simplified circuit shown in Figure 7 and the table of valve positions shown in Figure 8. In Figure 7 the four-way valves 102 and 140 are illustrated as circles and the solenoid-operated pilot valves which shift them have been omitted.

With the valves 102 and 140 in the position shown in the table of Figure 8 for the rapid advance function, the oil is withdrawn by the pump 10 through conduit 14 and delivered through conduits 18 and 98 to port 100 of valve 102 where it is directed to port 110 and through conduits 112 and 42 to the head end of cylinder 46. Oil discharged from the rod end passes through conduits 44 and 148 to port 146 of valve 140 where it is delivered to port 156, through conduit 158, valve 162, and conduit 172 to tank. Valve 162 is open at this time because pressure is transmitted from line 112 through conduit 170 to open the valve. The outlet path under these conditions is shown by the dotted arrow 1. The circuit just described is that established when solenoid 234 is energized and solenoid 232 is deenergized.

As the piston 48 reaches the point where dog 58 closes limit switch 64, the solenoid 232 becomes energized as previously described and valve 140 is shifted to the position for feed as shown in Figure 8. Under these conditions the flow to the head end of the cylinder 46 is the same as before while the outlet path for fluid from the rod end is now delivered from port 146 to port 138 and through conduits 136 and 134, flow control valve 122—118, conduit 116, ports 114 and 104 of valve 102, conduits 108 and 36 to tank. This outlet path is indicated by the dotted arrow 2. Under these conditions the piston 48 can travel only as fast as the setting of the throttle 118 dictates, and this rate of flow is maintained by the action of the hydrostatic valve 122 independently of variations in the resisting load which the piston 48 must overcome.

As the piston reaches its lower limit the dog 60 opens the limit switch 66, thus deenergizing the solenoid 234 and shifting the valve 102 to the position shown in Table 8 for rapid return. Under these conditions oil which is delivered by the pump flows from port 100 to port 114 of valve 102 through conduit 116, check valve 144, conduits 142 and 136, ports 138 and 146 of valve 140, and conduits 148 and 44 to the rod end of cylinder 46. Fluid delivered from the head end is discharged through conduits 42 and 112, ports 110 and 104 of valve 102, and conduits 108 and 36 to tank. This outlet path is shown by the dotted arrow 3. Thus the piston 48 is caused to return upwardly at a rapid rate.

When the piston reaches its uppermost position the limit switch 62 is opened, thus deenergizing solenoid 232 to shift the valve 140 to the position shown for stop in Table 8. Under these conditions oil delivered by the pump to port 138 of valve 140 is transferred to the port 150 thereof and through conduit 154 to tank. The pump is thus by-passed through the outlet path indicated by the dotted arrow 4 at negligible pressure. It will be noted also that due to lack of pressure in line 112, the valve 162 moves to closed position, thus preventing downward travel of the piston 48 under its gravity bias.

The present control panel is so constructed that the pilot valves and solenoids for operating the same are arranged in the two side sections 30 and 32 which may be assembled to a center section 26 of one capacity or another, thus providing a flexible unit system wherein complete control panels for operating fluid motors of various sizes may be readily assembled from fewer standard parts than otherwise.

The foot valve 162 presents the advantage that during both the rapid advance and the feed movements of the cylinder the latter is positively opened by pressure in the high side of the system and consequently there is no load imposed by the foot valve which the pump must overcome in order to move the piston 48. Thus the full capacity of the pump plus the gravity bias is available for effective work particularly during the feed portion of the cycle, and yet the valve 162 is effective to maintain the piston stationary against a gravity load of any magnitude.

The present invention has been described in a form suitable for use with a unitary power transmission system wherein a single pump feeds a single motor through the novel control panel described. It will be understood, however, that where a single pump feeds other apparatus in addition to that controlled by the present panel or where a separate pump unloading valve is used, it may be undesirable to unload the pump when the valves 102 and 140 are in stop position. In such cases the valve 140 may be constructed as a three-way valve omitting the port 150. Preferably this is accomplished by substituting a different valve spool having its lands properly arranged so as to control ports 138, 146 and 156 in the manner disclosed but arranged to block port 150 in all positions.

While the form of embodiment of the invention as herein disclosed constitutes a preferred form, it is to be understood that other forms might be adopted, all coming within the scope of the claims which follow.

What is claimed is as follows:

1. In a fluid power transmission system the combination with a source of pressure fluid of a fluid motor, fluid supply and return conduits leading from and to the source of fluid, a pair of directional control valves each independently shiftable between only two positions and connected to one of said conduits, and branch conduits connecting said valves to each other and to the motor and forming with said valves four different paths for fluid between opposite sides of said source, one of said paths providing a by-pass through both valves around the source, the other three paths providing flow to and from the motor in both directions including two differently controlled paths between the motor and the source in one direction.

2. In a fluid power transmission system the combination with a source of pressure fluid of a fluid motor, fluid supply and return conduits leading from and to the source of fluid, a pair of directional control valves each independently shiftable between only two positions and connected to one of said conduits, and branch conduits connecting said valves to each other and to the motor and forming with said valves four different paths for fluid between opposite sides of said source including at least one path extending through both valves between the motor and the source, one of said paths providing a by-pass around the source, the other three paths providing flow to and from the motor in each direction with a flow rate controller in one path.

3. In a fluid power transmission system the combination with a source of pressure fluid of a fluid motor, fluid supply and return conduits leading from and to the source of fluid, a pair of directional control valves each independently shiftable between only two positions and connected to one of said conduits, and branch conduits connecting each of said valves both to the other valve and to the motor and forming with said valves four different paths for fluid between opposite sides of said source, one of said paths providing a by-pass around the source, the other three paths providing flow to and from the motor in both directions including two differently controlled paths between the motor and the source in one direction, one of which extends through both valves between the motor and the source.

4. In a fluid power transmission system the combination with a source of pressure fluid including a pump, fluid supply and return conduits leading from and to the source, a fluid motor, a pair of motor conduits extending to opposite sides of the motor, a first directional control valve having connections with said supply and return conduits and with one of said motor conduits, a second directional control valve having connections with the other motor conduit, with the first valve and with at least one of said supply and return conduits, means in one of said connections for producing a regulated reduced rate of flow therein, and means for shifting each of said valves independently between either of two positions to provide operation of the motor at one speed in either direction, at a different speed in one direction and to stop the motor.

5. In a fluid power transmission system the combination with a source of pressure fluid including a pump, fluid supply and return conduits leading from and to the source, a fluid motor, a pair of motor conduits extending to opposite sides of the motor, a first directional control valve having connections with said supply and return conduits and with one of said motor conduits, a second directional control valve having connections with the other motor conduit, with the first valve and with at least one of said supply and return conduits, means in one of said connections for producing a regulated reduced rate of flow therein, and means including a pair of yieldably biased electric operators for shifting each of said valves independently between either of two positions to provide operation of the motor at one speed in either direction, at a different speed in one direction and to stop the motor by selective energization of said electric operators.

6. In a fluid power transmission system the combination with a source of pressure fluid including a pump, fluid supply and return conduits leading from and to the source, a fluid motor, a pair of motor conduits extending to opposite sides of the motor, a pair of directional control valves each independently movable between only two effective positions, connections between each valve and at least one of said supply and return conduits, between each valve and the other valve and between each valve and at least one of the motor conduits, and means for shifting said valves selectively between said positions to provide three different operating circuits between the source and the motor and a fourth valve setting in which the motor is stopped.

7. In a fluid power transmission system the combination with a source of pressure fluid including a pump, fluid supply and return conduits leading from and to the source, a fluid motor, a pair of motor conduits extending to opposite sides of the motor, a pair of directional control valves each independently movable between only two effective positions, connections between each valve and at least one of said supply and return conduits, between each valve and the other valve and between each valve and at least one of the motor conduits, and means for shifting said valves selectively between said positions to provide three different operating circuits between the source and the motor and a fourth valve setting in which the motor is stopped, said valves and connections forming at least two fluid paths which extend between the source and one valve through the other valve independently of the motor.

FERRIS T. HARRINGTON.